United States Patent
Mori et al.

(10) Patent No.: US 7,085,809 B2
(45) Date of Patent: Aug. 1, 2006

(54) DATA SYNCHRONIZATION SYSTEM, DATA SYNCHRONIZATION METHOD, DATA CENTER, AND CLIENT TERMINAL

(75) Inventors: Shinichiro Mori, Kawasaki (JP); Ai Ogawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 673 days.

(21) Appl. No.: 10/054,353

(22) Filed: Jan. 22, 2002

(65) Prior Publication Data

US 2003/0055996 A1  Mar. 20, 2003

(30) Foreign Application Priority Data

Sep. 18, 2001   (JP) .............................. 2001-283421

(51) Int. Cl.
*G06F 15/16* (2006.01)

(52) U.S. Cl. ............ 709/203; 709/227; 709/230; 709/232; 370/352; 713/375

(58) Field of Classification Search ........... 709/203, 709/232, 400, 227, 230; 713/375; 707/201, 707/200, 10, 203; 370/352
See application file for complete search history.

(56) References Cited

U.S. PATENT DOCUMENTS

| | | | | |
|---|---|---|---|---|
| 5,832,489 A | * | 11/1998 | Kucala | 707/10 |
| 5,896,566 A | * | 4/1999 | Averbuch et al. | 455/419 |
| 6,034,621 A | * | 3/2000 | Kaufman | 340/7.21 |
| 6,748,359 B1 | * | 6/2004 | Colnot | 704/270 |
| 6,788,953 B1 | * | 9/2004 | Cheah et al. | 455/550.1 |
| 6,810,405 B1 | * | 10/2004 | LaRue et al. | 707/201 |
| 2002/0035618 A1 | * | 3/2002 | Mendez et al. | 709/219 |
| 2002/0099727 A1 | * | 7/2002 | Kadyk et al. | 707/201 |
| 2003/0043987 A1 | * | 3/2003 | Crockett et al. | 379/207.02 |

FOREIGN PATENT DOCUMENTS

| | | |
|---|---|---|
| EP | 917 077 | 5/1999 |
| JP | 10-23073 | 1/1998 |
| JP | 11-252666 | 9/1999 |

* cited by examiner

*Primary Examiner*—Jeffrey Pwu
(74) *Attorney, Agent, or Firm*—Greer, Burns & Crain, Ltd.

(57) ABSTRACT

There is provided a data synchronization system, data synchronization method, data center, and client terminal that allow a client terminal to determine whether data held by the client terminal is up-to-date and allow synchronization between a server and the client to be maintained at low costs in a case where synchronization between data in the server and data in the client terminal is provided.

The data synchronization system for keeping the sameness between data in a client terminal 10 and data in a data server 20 through a communication link comprises a synchronization data transmitter 25 for sending to the client terminal 10 data to be kept same as data in the client terminal 10, a synchronization signal output module 33 for sending a synchronization signal for checking the sameness to the client terminal 10 at predetermined timing, and a synchronization signal transmission controller 23 for controlling the transmission of the synchronization signal by the synchronization signal output module 33 based on the result of the synchronization signal transmission by the synchronization signal output module 33.

10 Claims, 9 Drawing Sheets

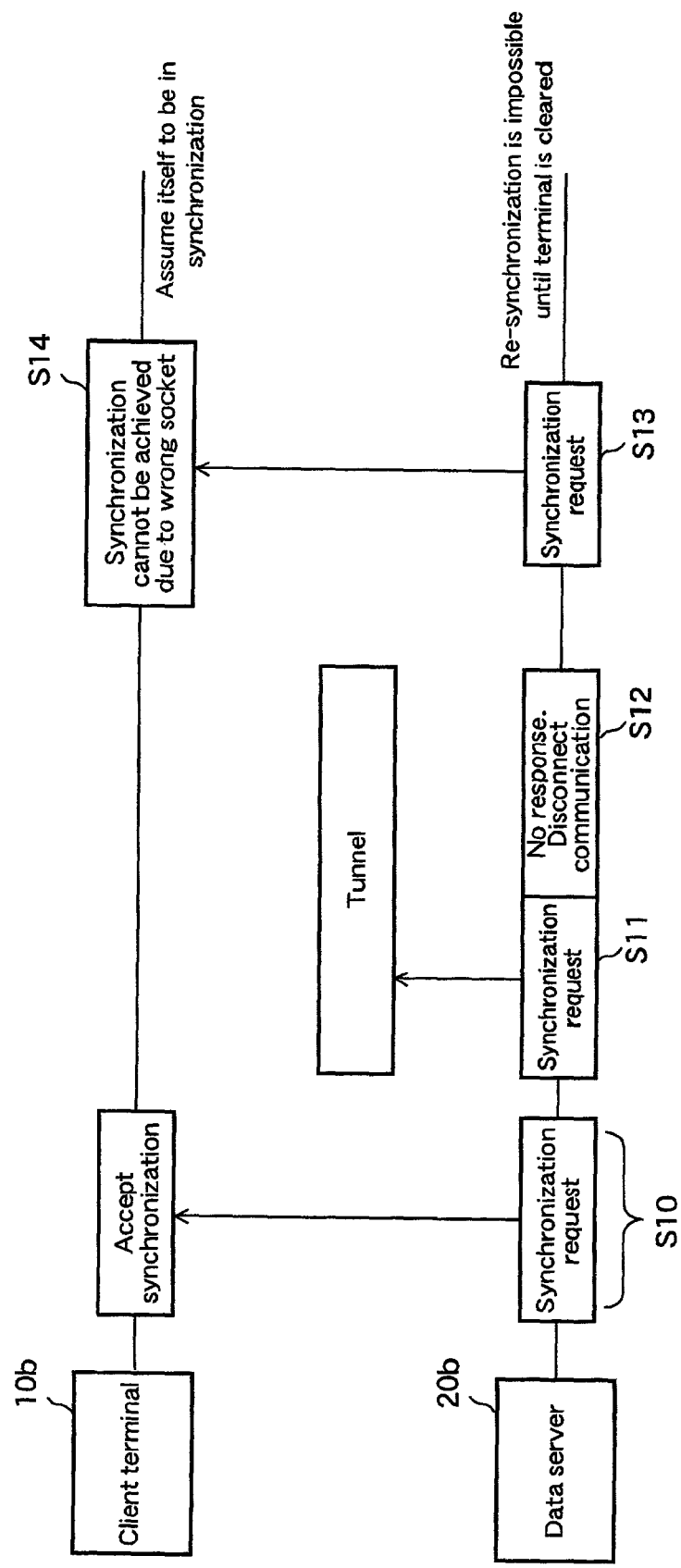

DATA SYNCHRONIZATION SYSTEM, DATA SYNCHRONIZATION METHOD, DATA CENTER, AND CLIENT TERMINAL

BACKGROUND OF THE INVENTION

1. Field of the Invention

The present invention relates to a data synchronization system, data synchronization method, data center, and client terminal for maintaining the sameness between data in a client terminal and data in a server, and in particular, to a data synchronization system, data synchronization method, data center, and client terminal for maintaining the sameness of data by using Push type communication.

2. Description of the Related Art

With today's widespread use of portable information terminals, it has become commonplace that a fixed information terminal (hereinafter called server) such as a desktop personal computer is used in an office and in addition a portable information terminal (hereinafter called client terminal) is used outside the office. In such cases, in order to maintain the compatibility of data in the client terminal with data in the server, both of the systems should be synchronized (or, the sameness of data should be maintained). To achieve synchronization, a method is widely used in which a device such as a cradle is used to connect the client terminal to the server and synchronize them.

To wirelessly connect the client terminal to the server, a method is also used in which the communication facility of a mobile phone is used to synchronize data. Circuit switching has been used for synchronization using the communication facility. However, the circuit switching is unsuitable for transmitting a small amount of data to a number of terminals. In response to the recent commencement of services using packet communication, synchronization using packet communication in place of the circuit switching has been introduced. In addition, data transmission using "push" services has been made available.

FIG. 9 shows one method that uses such a technology and is a time chart during data synchronization between a client terminal 10a and a data server 20a. This method uses an IP solution Alive signal. The client terminal 10a continues sending the Alive signal to the data server 20a at predetermined time intervals to indicate to the data server 20a that the client terminal 10a is within an area in which it can receive data (S1). The data server 20a receives the Alive signal and, if there is updated data in data to be synchronized in the data server 20a, sends a synchronization request to the client terminal 10a (S2).

However, if the client terminal 10a moves into a dead space such as a tunnel where radio waves do not reach during the transmission of the synchronization request, the synchronization request does not reach the client terminal 10a. Also, the Alive signal does not reach the data server 20a. Accordingly, the data server 20a receives no reply from the client terminal 10a and therefore breaks the communication link (S3). When the client terminal 10a subsequently moves out of the tunnel into an area where radio waves can be received from the server, the Alive signal is sent to the data server 20a. However, it results in a socket error because of the passage of the client terminal 10a through the tunnel (S4). The data server 20a cannot receive the Alive signal due to the socket error.

FIG. 10 shows a synchronization method in which synchronization is provided without using the Alive signal. First, a data server 20b sends a synchronization request to a client terminal 10b if there is updated data in data to be synchronized in the data server 20b. Then, if the client terminal 10b is within an area where it can receive radio waves from the server 20b, it accepts the synchronization request and data synchronization is performed successfully (S10). However, if the client terminal 10b moves into a dead space such as a tunnel where radio waves do not reach during the transmission of the synchronization request, the synchronization request does not arrive at client terminal 10b (S11). Accordingly, the data server 20b receives no reply from the client terminal 10a, therefore a socket open error occurs and the data server 20b breaks the communication link (S12). In this case the client terminal 10b cannot know this situation and persistently has the realization that synchronization is maintained. Therefore, even if the server 20b re-sends the synchronization request after the client terminal 10b moves out of the tunnel into an area where it can receive radio waves from the client 20b (S13). synchronization is lost because the socket number is wrong (S14). In order to solve this problem, it is required that the client terminal 10b be reset by power shutdown.

The above-described methods that use a device such as a cradle to connect a client terminal to a server is troublesome because it requires that the client and server be physically connected with each other each time synchronization is performed. In addition, it is difficult to use the most up-to-date information because data can be updated only a few times a day depending on a user's situation.

Using a packet communication service or a push service to transmit data during a synchronization process has an advantage in its suitability for data delivery compared with circuit switching services. However, connections and disconnections occur frequently in a wireless section and a client terminal cannot determine whether a synchronization request is sent from a server or not while communication is disconnected. That is, the user of a portable information terminal has no means for determining whether data in his/her own terminal is up-to-date or not.

The method as shown in FIG. 9 in which the communication facility of a mobile phone is used to achieve data synchronization allows the number of data updates to be increased. However, it is a waste of communication to send an Alive signal when there is no data to be synchronized. That is, because the data server 20a cannot distinguish the Alive signal from other signals on the arrival, it establishes a connection to check the content of any incoming signal. Therefore, connection is always established even when a synchronization is not necessary and extra costs will be entailed in packet communication, which charges for data. In addition, after a socket error occurs, it is difficult to synchronize between data in the client server 10a and the data server 20a.

According to method shown in FIG. 10 that does not use the Alive signal, the data server 20b disconnects communication if a socket error occurs, but the client terminal 10b persistently has the realization that it is still connected to the network. Such a communication mix-up makes data synchronization difficult.

The present invention has been made to solve these problems. It is an object of the present invention to provide a data synchronization system, data synchronization method, data center, and client terminal, wherein the client terminal can determine whether information held by the client terminal is up-to-date, and when used in a public mobile phone network, synchronization between a server and the client can be maintained in consideration of disconnections and connections associated with the movement of the client terminal and cost for maintaining a session (such as costs for Alive signal transmission) can be reduced.

SUMMARY OF THE INVENTION

To solve these problems, the present invention is characterized by a data center for keeping the identicalness or sameness between data in a client terminal and data in a server through a communication link, the data center comprising: a server for storing data to be kept same as data in the client terminal; data transmission means for sending data to be kept same as the data in the client terminal to the client terminal; signal transmission means for sending a signal for checking the sameness at predetermined timing to the client terminal; and control means for controlling the signal transmission performed by the signal transmission means based on the result of the transmission by the data transmission means.

According to this configuration, communication for checking the sameness of data and communication for transmitting data to be kept same (hereinafter called "synchronization data") are performed separately, therefore the signal for checking the sameness (hereinafter called "synchronization signal") can be sent to the client terminal at predetermined intervals and the client terminal can consistently determine whether data in the client terminal is kept same as (synchronized with) data in the server. Because the synchronization signal is being sent as long as synchronization between the server and client is maintained, the client terminal can ensure that they are in synchronization with each other simply by checking whether it receives the synchronization signal.

In an embodiment of the present invention, the data center consists of a data server and a synchronization server. The data server represents the server for storing data. The data transmission means is implemented by synchronization data transmission means of the data server, the signal transmission means is implemented by synchronization signal output means of the synchronization server, and the control means is implemented by signal transmission controller of the data server. In the embodiment of the present invention, data transmission process performed by the data transmission means includes a synchronization request (the transmission of the synchronization request) performed before the transmission of updated data in a database. These components of the data center may be provided in a single server. However, the form of the data center is not limited. For example, the components other than the server may be implemented in a separate device from the server storing data.

In addition, according to the present invention, if receipt occurs at the client terminal, the type of the receipt is determined on the client terminal. If it is determined that the receipt is the receipt of a synchronization signal, a line for the receipt can be disconnected. This enables the reduction of communication costs for checking the sameness (hereinafter called "synchronization check"). According to the embodiment of the present invention, an arrival determination module determines the type of receipt at the client terminal.

In the embodiment of the present invention, a server (hereinafter called "synchronization server") for sending a synchronization signal and another server for sending synchronization data (hereinafter called "data server") are provided and the telephone numbers of these servers are different from each other. The number of servers is not limited. It may be one in which the above-mentioned signal transmission means and data transmission means are provided, if a telephone number for sending the synchronization signal and a different telephone number for sending the synchronization data can be set. Each server and a client terminal are connected through a radio communication link. When a call arrived at the client terminal, it checks the telephone number of the sender. If the telephone number of the sender is the telephone number of the synchronization server, the client terminal disconnects the link for the received call before communication connection incurring a charge is established. Thus, costs for synchronization signal transmission can be reduced. The transmission of the synchronization signal is not limited to telephone. The synchronization signal may be carried by other means (such as other radio waves, sound wave, or infrared) that allows the synchronization signal to be distinguished from a synchronization request from the data server.

If the client terminal moves into an area where the client terminal cannot receive a telephone call, synchronization data cannot be sent to the client terminal. In such a case, the control means controls the signal transmission means to stop the transmission of the synchronization signal according to the present invention. When data transmission after the transmission of the synchronization signal is stopped succeeds, the control means may control the synchronization signal transmission means to resume the transmission of the signal for checking synchronization. In the embodiment of the present invention, the control is performed by a synchronization signal transmission controller of the data server. This configuration allows the client terminal to know the data sameness status (synchronization status) from the presence of a receipt of the synchronization signal. In addition, the status can be displayed on the client terminal, thereby allowing the user to clearly determine whether data held in the client terminal is up-to-date or not.

The present invention also provides a client terminal for keeping the sameness between data in the client terminal and a server through a communication link, the client terminal comprising: receiving means for receiving data to be kept same as data in the server and a signal for checking the sameness, the data being sent to the client terminal when needed and the signal being sent at predetermined timing; receiving status detecting means for detecting the receiving status of the signal for checking the sameness sent at the predetermined timing; and processing means for performing a predetermined process based on the receiving status detected by the receiving status detecting means. Operations for checking and maintaining data sameness can readily performed by using the client terminal having this configuration.

The following invention can be extracted from the embodiment.

There is provided a data synchronization system for synchronizing data between a client terminal and a server through a communication link, comprising data transmission means for sending data to be synchronized with data in the client terminal to the client terminal: signal transmission means for sending a signal for checking synchronization to the client terminal at predetermined timing; and control means for controlling the signal transmission by the signal transmission means based on the result of the transmission by the data transmission means.

The control means stops signal transmission by the signal transmission means if the transmission by the data transmission means fails. In addition, the control means causes signal transmission means to resume the signal transmission if data transmission performed by the data transmission means after the signal transmission by the signal transmission means is stopped succeeds. The client terminal comprises receipt type determination means for determining the type of receipt and connection control means for controlling connection and disconnection of a link for the receipt based on the result of the determination by the receipt type determination means.

If the receipt type determination means determines that the receipt is the receipt of a signal sent from the signal transmission means, the connection control means disconnect the link for the receipt. Different sender telephone numbers are set for the data transmission means and the signal transmission means. The receipt type determination means determines the receipt type based on the sender telephone number.

The client terminal further comprises synchronization status determination means for determining the current synchronization status based on the signal strength of a received signal and whether a signal is received or not and display means for displaying the result of the determination of the synchronization status determination means.

BRIEF DESCRIPTION OF THE DRAWINGS

FIG. 10 shows an example of prior-art synchronization methods which does not use the Alive signal.

DETAILED DESCRIPTION OF THE PREFERRED EMBODIMENT

An embodiment of the present invention will be described below with respect to the accompanying drawings.

Figure 1:
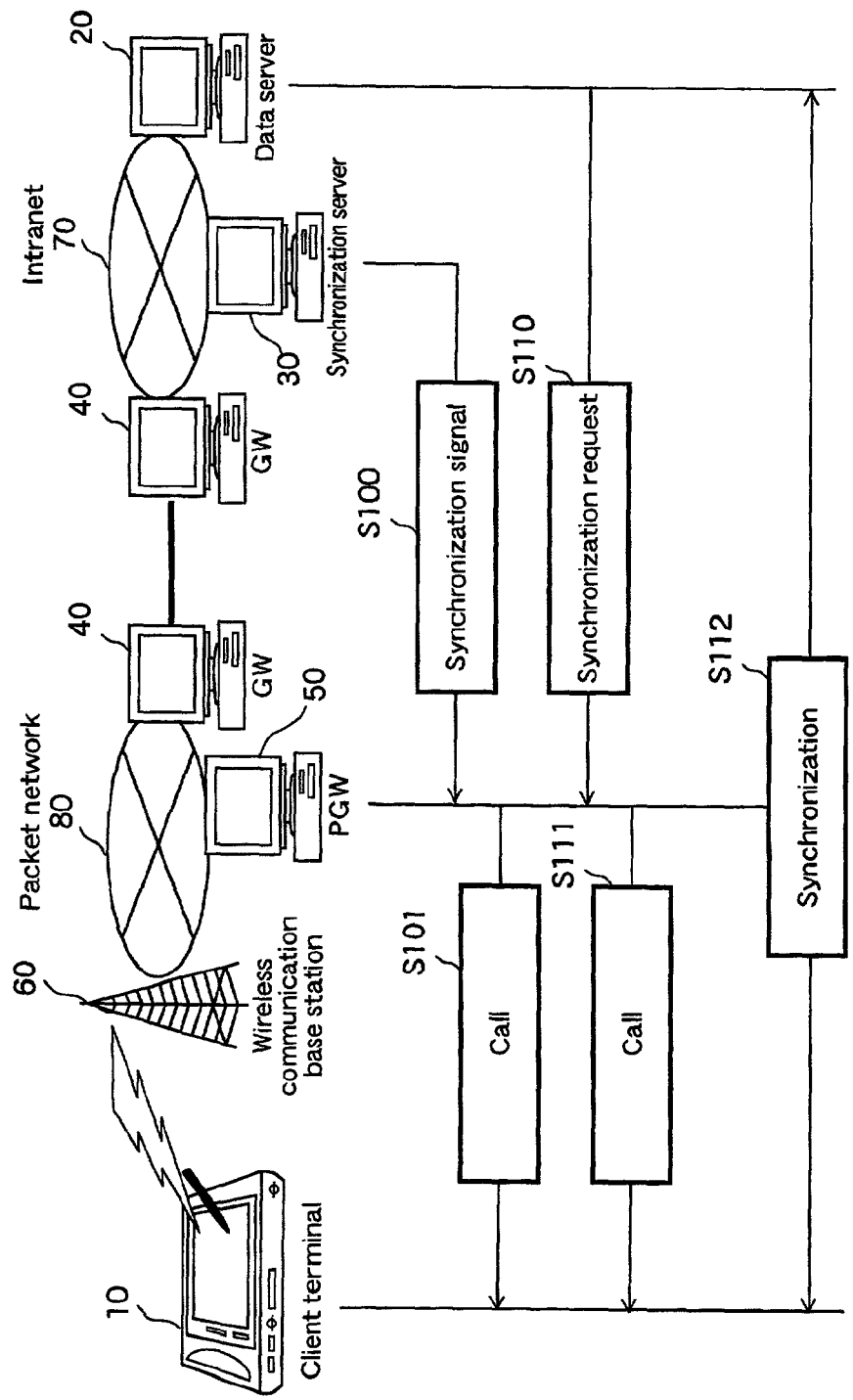
FIG. 1 schematically shows a configuration of and a process flow in a data transmission system according to an embodiment of the present invention.

FIG. 1 shows an exemplary general configuration and process flow of a data transmission system according to an embodiment of the present invention. A client terminal 10 is connected by wireless to a packet network 80 through a wireless communication base station 60. A PGW (Packet Gateway) 50 is provided in the packet network 80. A data server 20 and a synchronization server 30 are provided in an intranet 70. The data server 20 is a server for transmitting and receiving data to be synchronized (hereinafter called "synchronization data") with data in the client terminal 10 and also controlling the synchronization server 30. The synchronization server 30 has the function of sending a predetermined pulse (hereinafter called "synchronization signal") to the client terminal 10 at predetermined intervals to allow the client terminal 10 to determine that it is in synchronization with the data server 20. The packet network 80 and the intranet 70 are interconnected through PGW (Gateways) 40 over a leased line such as an ISDN. The PGW 50 communicates with the synchronization server 30 or the data server 20 on an IP solution.

A general process flow in the present embodiment will be described. As shown in FIG. 1, a synchronization signal is sent from the synchronization server 30 to the client terminal 10 (S100). The synchronization signal is received by the PGW 50 and sent to the client terminal 10 in the form of an incoming phone call as is (S101). The client terminal 10 checks the incoming call, and if it determines that the call is sent from the synchronization server 30, disconnects the line for the incoming call so as not to incur a charge. If the synchronization signal still continues to arrive, the client terminal 10 determines that it is in synchronization with the data server 20.

If synchronization data in the data server 20 is updated, the data server 20 sends a synchronization request to the client 10 in order to reflect the update in data in the client terminal 10 (S110). The synchronization request is received by the PGW 50 and sent to the client terminal 10 in the form of incoming phone call as is (S111). The client terminal 10 checks the incoming call, and if it determines that the call is sent from the data server 20, does not disconnect the line. After PPP communication connection is established, the updated data is sent to perform synchronization (S112).

In the present invention, the telephone numbers of the data server 20 and the synchronization server 30 are different. On the arrival of a call, the client terminal 10 checks the telephone number of its sender to determine whether it is a synchronization signal sent from the synchronization server 30 or a synchronization request sent from the data server 20. In this example, it is assumed that the phone number of the client terminal 10 is 090-1234-5678, the phone number of the synchronization server 30 is 090-0001-1234, and the phone number of the data server 20 is 090-0000-1111. It is also assumed that the data server 20 and the synchronization server 30 perform transmission with caller number indication turned on. The synchronization signal is not limited to the form of a telephone call. It may be any other means (other radio waves, sound wave, infrared, or other means) that can be distinguished from a synchronization request sent from the data server 20.

Figure 2:
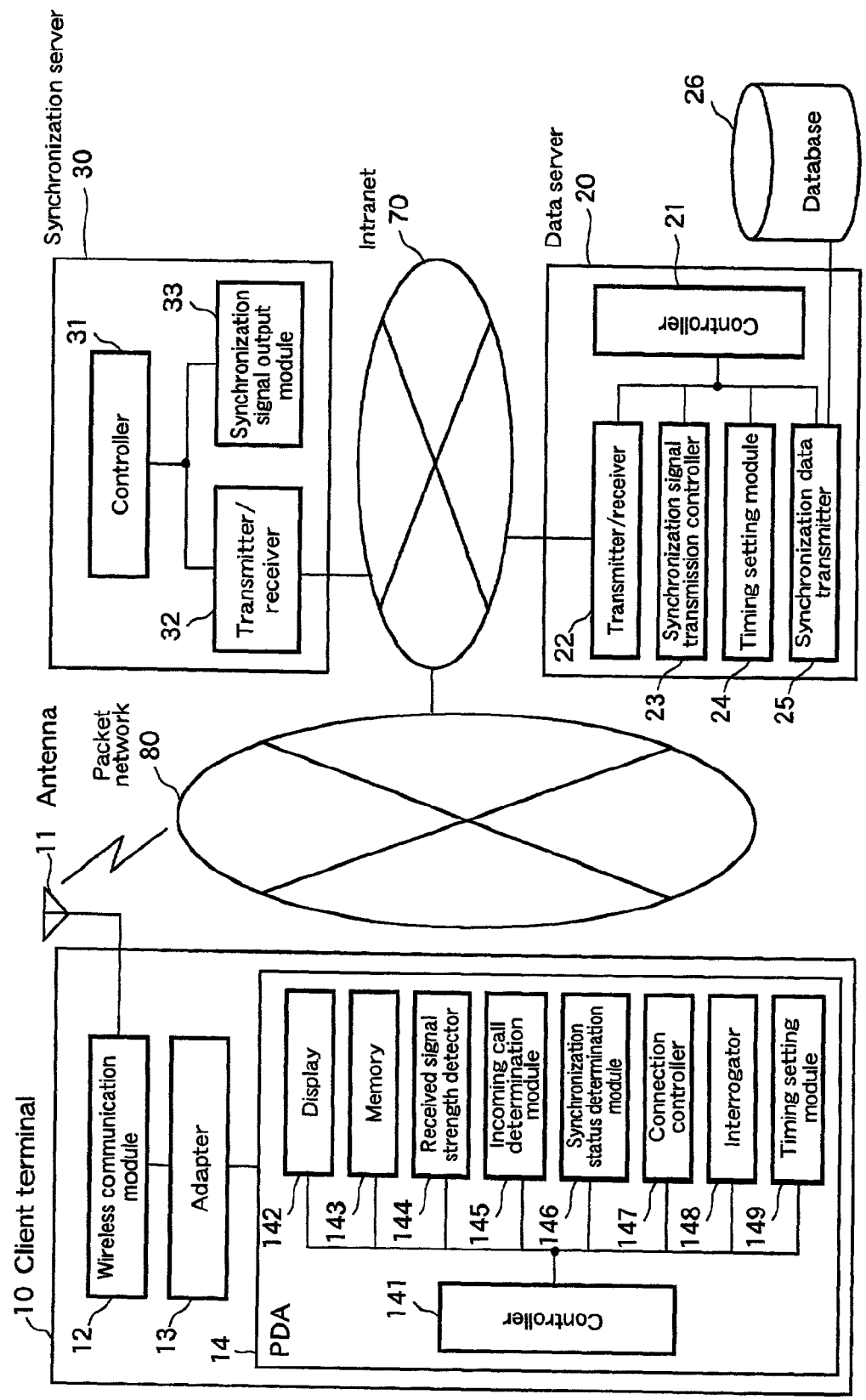
FIG. 2 is a block diagram of a general functional configuration of the system.

FIG. 2 shows a block diagram of a general functional configuration of the system. The client terminal 10 connected to the packet network 80 comprises a wireless communication module 12 formed by a mobile phone, Personal Handy-phone System, or mobile card for performing wireless communication, a PDA (Personal Digital Assistant) 14, and an adapter module 13 connecting the wireless communication module 12 and the PDA 14. An antenna 11 is provided in the wireless communication module 12 that allows wireless communication. The PDA 14 comprises a display 142 for displaying text and images, a memory 143 for storing data and settings, a received signal strength detector 144 for sensing the strength of a received signal, an incoming call determination module 145 for determining the sender of a call on the arrival of the call, a synchronization status determining module 146 for determining the status of synchronization with the data server 20, a connection controller 147 for controlling connection or disconnection of a line for the incoming call, an interrogator 148 for sending a synchronization data send request (hereinafter called "interrogation") to the data server 20 if the synchronization status determination module 146 determines that the client data is out of synchronization with data in the data server 20, and a timing setting module 149 for setting intervals (timing) of synchronization signal transmission to the synchronization server 30. All of these components are connected to and controlled by a controller 141.

The data server 20 and the synchronization server 30 are connected to the intranet 70. The data server 20 and the synchronization server 30 communicate with the client terminal 10 through the intranet 70 and the packet network 80. The data server 20 has a database 26 storing data to be synchronized (synchronization data) with data in the client terminal 10. The data server 20 also comprises a transmitter/receiver 22 for communication, synchronization signal transmission controller 23 for controlling stop/restart of synchronization signal transmission to the synchronization server 30, a timing setting module 24 for setting intervals (timing) of synchronization signal transmission to the synchronization server 30, and a synchronization data transmitter 25 for sending synchronization data stored in the database 26 to the client terminal 10. All of these components are connected to and controlled by a controller 21. The synchronization server 30 comprises a transmitter/receiver 32 for communication, a synchronization signal output module 33 for outputting a synchronization signal, and a controller 31 for controlling these components.

Figure 3:
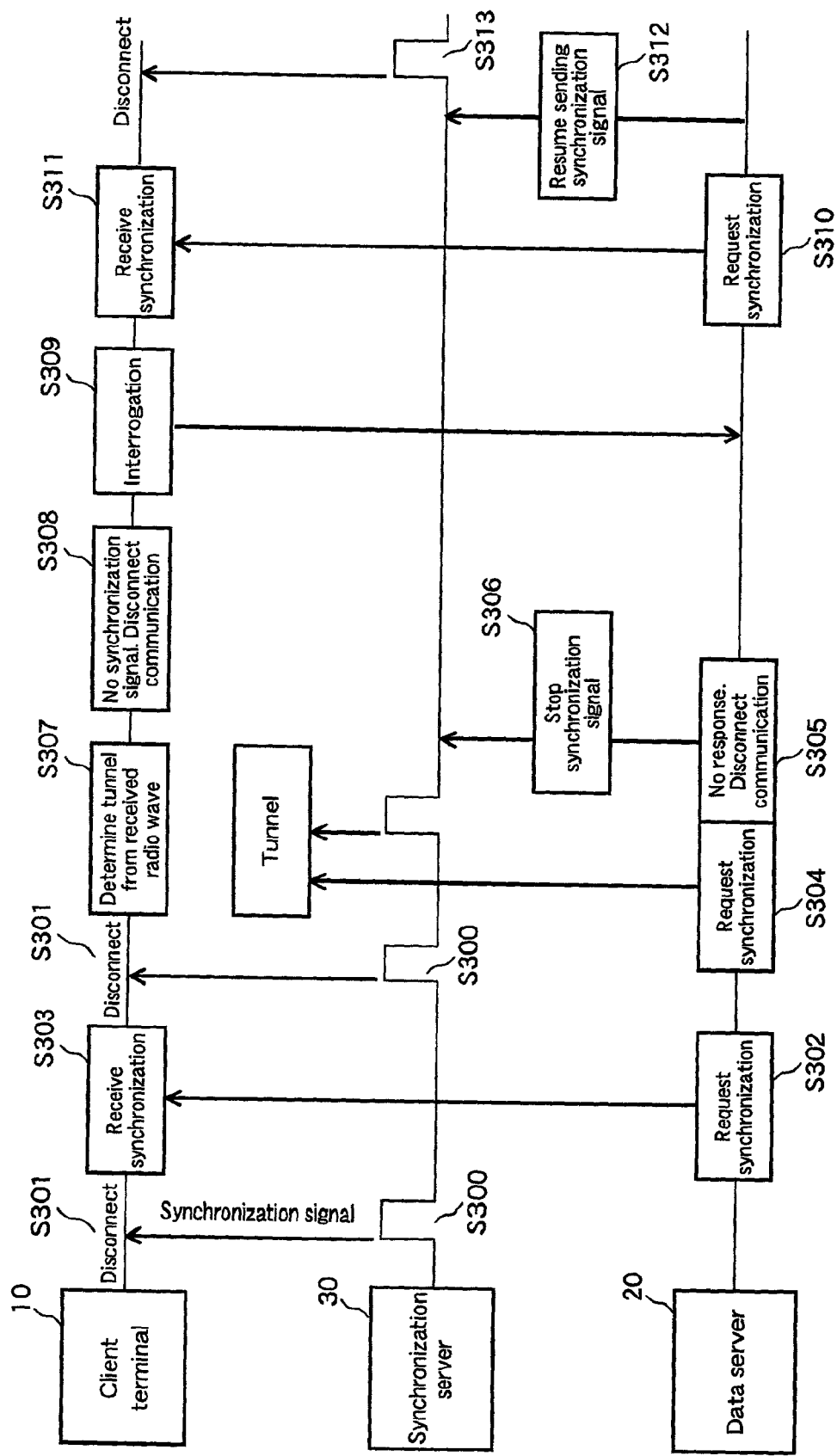
FIG. 3 is a time chart showing the details of the process flow in the system.

FIG. 3 is a time chart showing the details of the process flow in the above-described system. In FIG. 3, when data in the client terminal 10 is in synchronization with data server 20, the synchronization server 30 sends a synchronization signal to the client terminal 10 at predetermined intervals (S300). In particular, the synchronization signal output module 33 outputs a pulse at the predetermined intervals and the pulse is sent to the client terminal 10 through the transmitter/receiver 32. The synchronization signal is received by the wireless communication module 12 in the client terminal 10 and provided through the adapter 13 to the PDA 14, where it is checked. This check is performed by the incoming call determination module 145 of the PDA 14. It determines from the telephone number of the sender of the call whether the sending server is the data server 20 or the synchronization server 30. In the case of S300, it is determined that the incoming call is the synchronization signal sent from the synchronization server 30 and the result of the determination is provided to the connection controller 147 through the controller 141. The connection controller 147 confirms the arrival of the synchronization signal and disconnects the line before incurring a charge (S301).

The client terminal 10 can ensure that data in the client terminal 10 is in synchronization with data in the data server 20 when the synchronization signal arrives. A message (not shown) may be displayed on the display 142 of the client terminal 10 to indicate the synchronized state to the user of the terminal 10.

Figure 4:
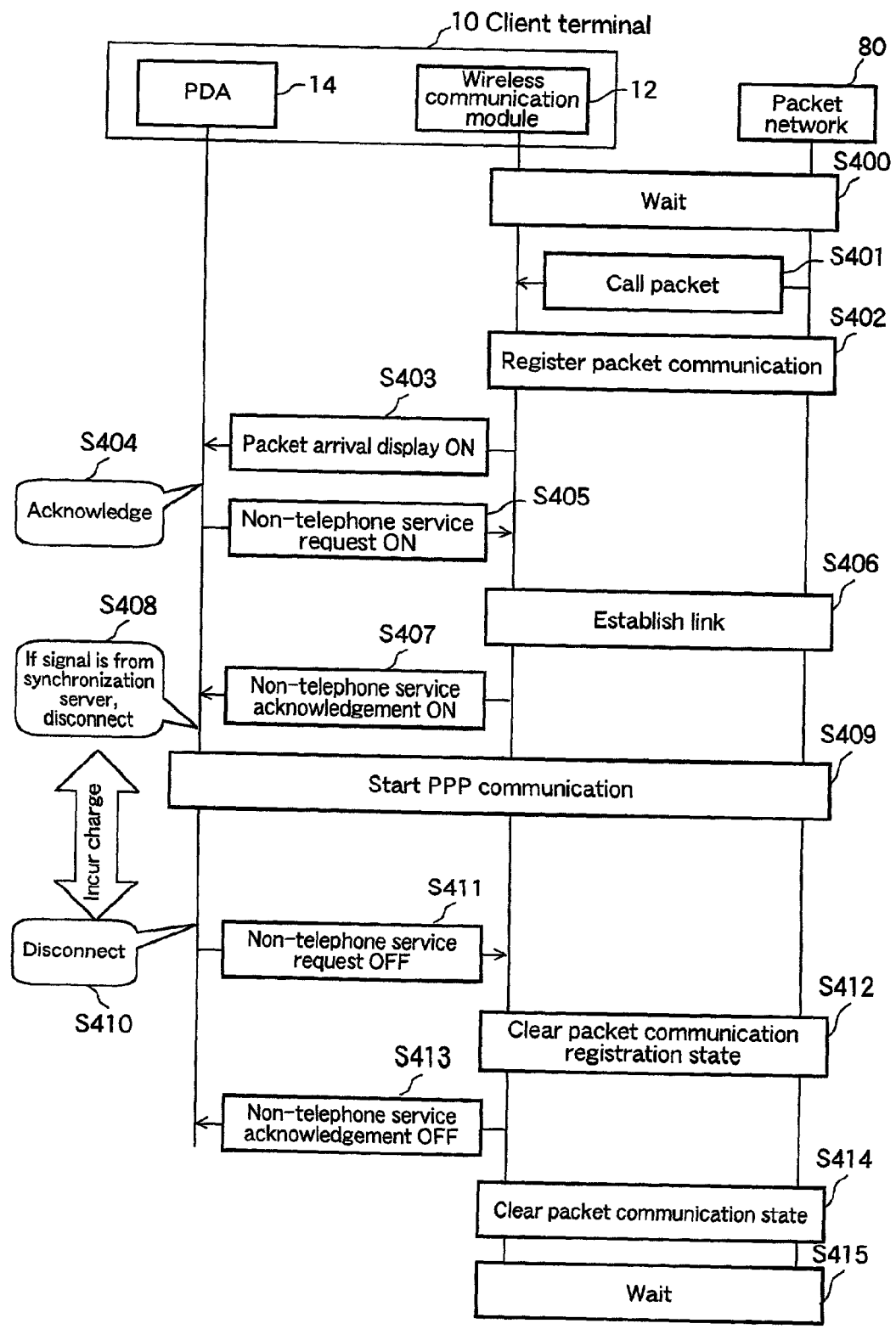
FIG. 4 is a flowchart showing a process flow from the initiation of a call to the arrival of the call and line disconnection, and a typical charged section.

FIG. 4 is a flowchart of a process flow from the initiation of a call to the arrival of the call and line disconnection, and a typical charged section. When a call packet is transmitted from the packet network 80 to the wireless communication module 12 (S401) in a wait state (S400), packet communication registration is performed (S402). This provides synchronization between the packet network 80 and the wireless communication module 12 and the wireless communication module 12 provides a packet arrival display ON indication to the PDA 14 (S403). The PDA 14 receives the packet arrival display ON indication, acknowledges (S404), and turns on a non-telephone-service request to the wireless communication module 12. A link is established between the packet network 80 and the client terminal 10 (S406) and a non-telephone-service acknowledgement ON indication is provided from the wireless communication module 12 to the PDA 14 (S407).

In this embodiment, if it is determined that an incoming call is a synchronization signal from the synchronization server 30, a line for the incoming call is disconnected (S408) before PPP communication connection, which incurs a charge, is established (S409). If it is determined that the incoming call is not a synchronization signal from the synchronization server 30, PPP communication is started (S409), data communication is performed, then the line is disconnected (S410). The section from step S409 to step S410 is subject to a charge. After the disconnection, the PDA 14 issues a non-telephone-service request OFF to the wireless communication module 12 (S411), the packet communication registration state is cleared (S412), and, in response to the clearance, the wireless communication module 12 provides a non-telephone-service acknowledgement OFF indication to the PDA 14 (S413). Then the packet state is cleared (S414) and the process returns to the wait state (S415).

In this way, the client terminal 10 determines, based on the telephone number of an incoming call, whether the incoming call is from the synchronization server 30, and if it is a incoming call from the synchronization server 30, disconnects the line before PPP connection is established, thus avoiding incurring a charge for receiving the synchronization signal and enabling the reduction of costs for the synchronization check.

If synchronization data in the database 26 provided in the data server 20 is updated, the synchronization data transmitter 25 of the data server 20 sends a synchronization request to the client terminal 10 (S302). If the client terminal 10 is not in a dead space at the time of sending a synchronization request, the client terminal 10 receives the synchronization request and checks the incoming call. If the client terminal 10 determines that the incoming call is from the data server 20, it does not disconnect the line and synchronization data is sent and received to and from the data server 20 to accomplish synchronization (S303). The received synchronization data is stored in the memory 143 of the client terminal 10.

If the synchronization request is sent while the client terminal 10 is in a dead space such as a tunnel (S304), the synchronization request does not reach the client terminal 10 and therefore no response is provided to the data server 20. Then the transmitter/receiver 22 of the data server 20 disconnects the communication (S305). At the same time, the synchronization signal transmission controller 23 directs the synchronization server 30 to stop the transmission of the synchronization signal (S306). Upon receiving the direction to stop the synchronization signal transmission, the synchronization signal output module 33 of the synchronization server 30 stops the transmission of the synchronization signal.

The controller 141 in the client terminal 10 determines that the client terminal 10 moves into a tunnel (dead space) based on the strength of a received signal detected by the received signal strength detector 144 (S307). After moving out of the tunnel, it becomes possible for the client terminal 10 to receive a signal. However, the synchronization signal transmission from the synchronization server 30 remains stopped. Because the synchronization signal that the synchronization status determination module 146 of the client terminal 10 should receive at predetermined intervals has stopped, it recognizes that the client terminal 10 and the data server 20 is out of synchronization and disconnects the communication (S308). In this embodiment, the interrogator 148 of the client terminal 10 sends an interrogation to the data server 20 (S309), then the connection is re-established to synchronize with the data server 20 (S310, S311). Instead of the interrogation sent from the client terminal 10, the data server 20 may restart sending the synchronization request at the predetermined intervals to achieve synchronization. After the synchronization is achieved, the synchronization signal transmission controller 23 of the data server 20 sends to the synchronization server 30 a direction to restart the synchronization signal transmission (S312). This causes the synchronization signal transmission to be resumed (S313).

The above-described process performed by the client terminal 10, data server 20, and synchronization server 30 will be individually described in detail with reference to flowcharts in FIGS. 5 through 7.

Figure 5:
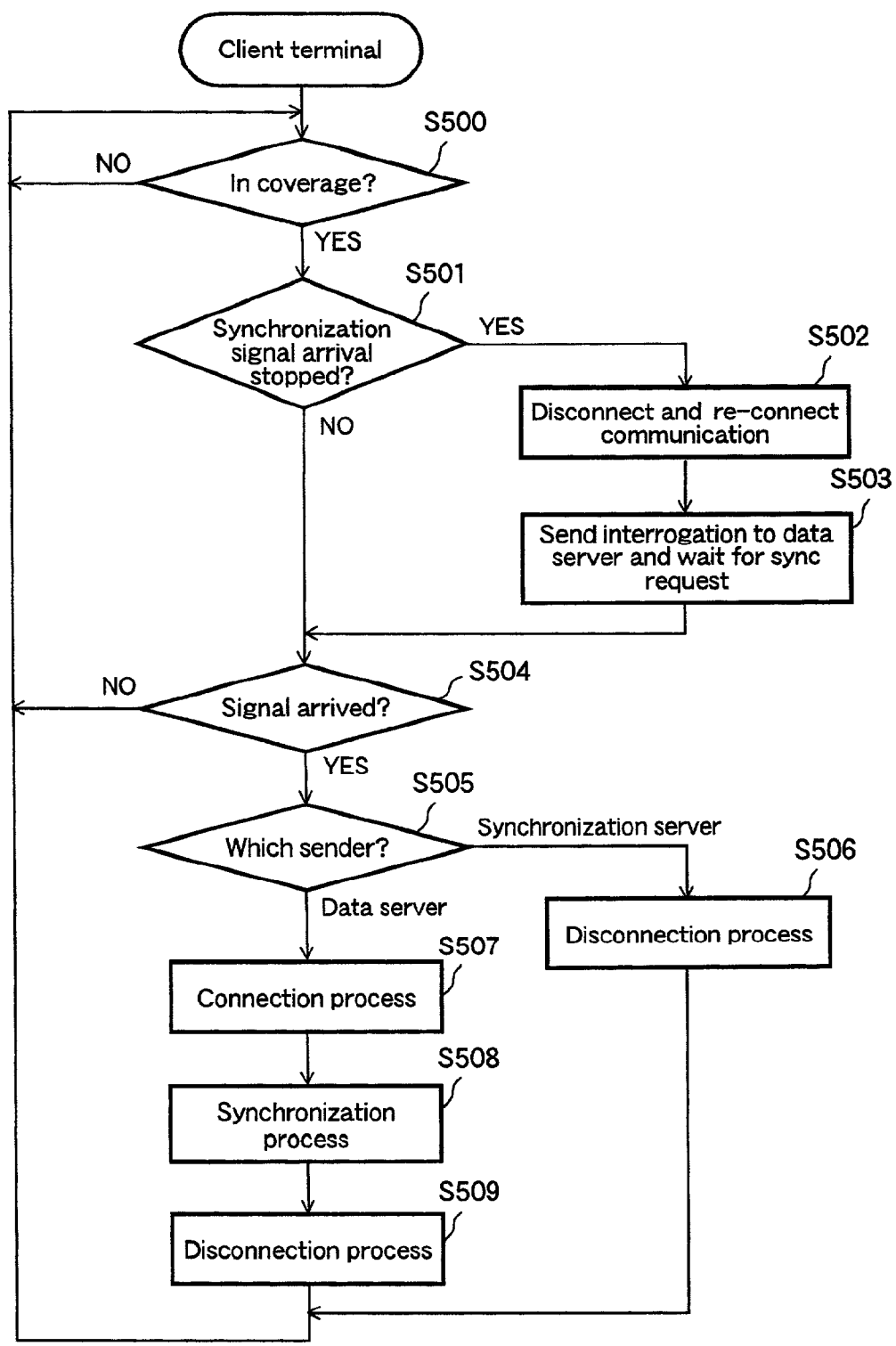
FIG. 5 is a flowchart of an operation flow in a client terminal.

FIG. 5 shows a flowchart of the flow of an operation performed in the client terminal 10. First, the controller 141 determines based on the strength of a received signal detected by the received signal strength detector 144 whether the current location of the client terminal 10 is within the coverage of a wireless communication base station 60. If it is outside the coverage (NO at step S500), the client terminal 10 waits for a signal. If it is within the coverage (YES at step S500), the synchronization status determination module 146 determines whether the synchronization signal has arrived or not (S501). If the synchronization signal does not arrive after predetermined timing (YES at step S501), the synchronization status determination module 146 determines that the arrival of the synchronization signal has ceased and the synchronization with the data server 20 has lost. Accordingly, the controller 141, in response to the determination, first disconnects the client terminal 10 from the network, then connects it to the network again (S502). Then the interrogator 148 sends an interrogation to the data server 20 to request for sending synchronization data from the data server 20. After the request, it waits for the arrival of a synchronization request sent from the data server 20 (S503). If the incoming synchronization signal has not ceased at step S501 (NO at step S501), it keeps listing to the synchronization signal.

When the synchronization signal arrives (YES at step S504), the incoming call determination module 145 identifies the server that sends the signal (S505). If the telephone number of the sender is 090-0001-1234, which is the number of the synchronization server 30, it determines that the received signal is a synchronization signal from the synchronization server 30, and disconnects the connection for the received signal so as not to incur a charge (S506).

If the telephone number of the sender is 090-0000-1111, it determines that the received signal is a synchronization request sent from the data server 20 and connects to the data server 20 (S507). After the connection is established, synchronization is performed between the client terminal 10 and the data server 20 (S508). After the completion of the synchronization, the line is disconnected (S509).

Figure 6:
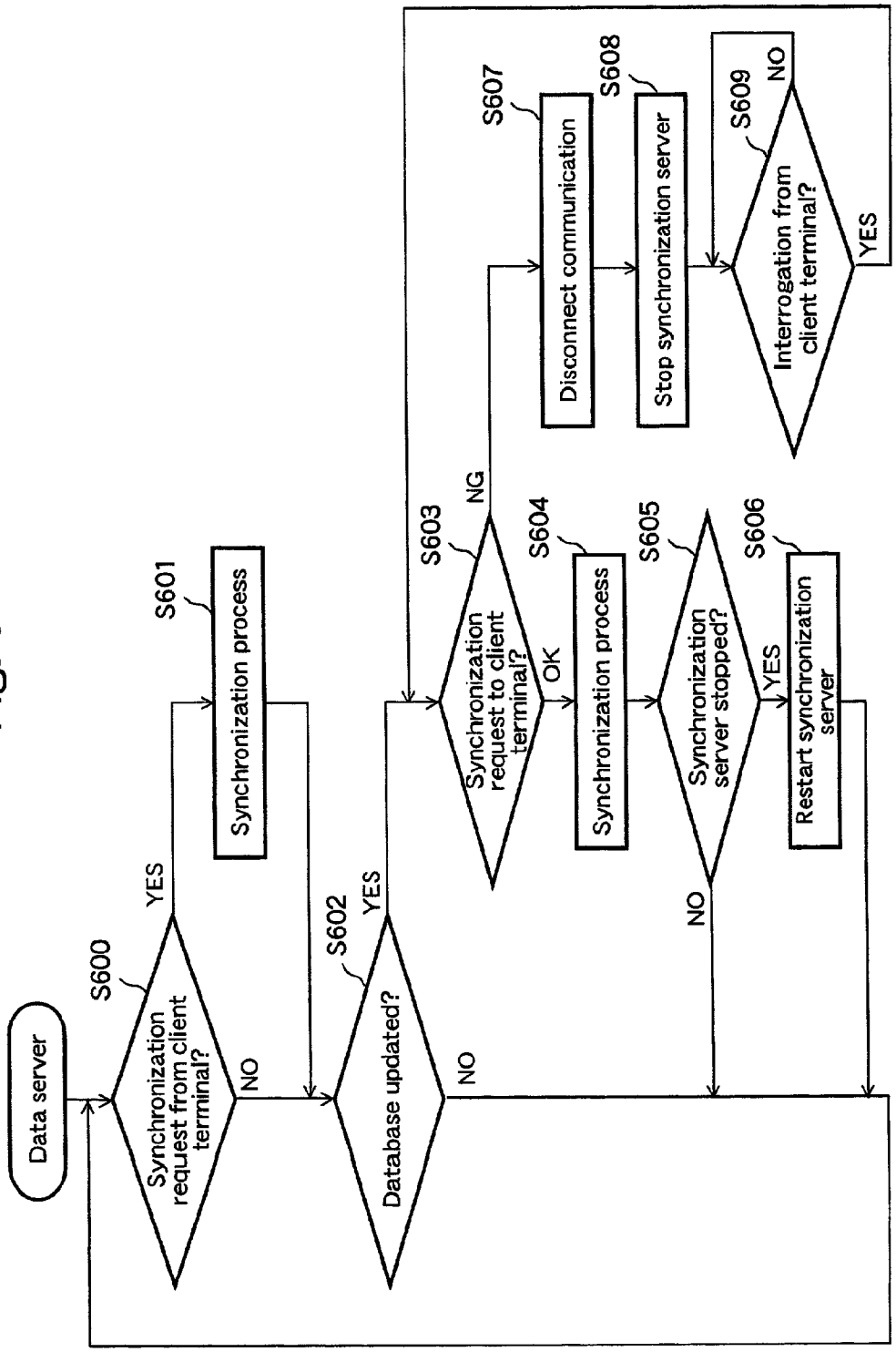
FIG. 6 is a flowchart of an operation flow in a data server.

FIG. 6 shows a flowchart of an operation flow in the data server 20. If data in the client terminal 10 is updated and the client terminal 10 sends a synchronization request to the data server 20 (YES at step S600), the data server 20 connects with the client terminal 10 to perform synchronization (S601). The synchronization request from the client terminal 10 is omitted in FIG. 3. If the database 26 of the data server 20 is updated (YES at step S602), a synchronization request is sent to the client terminal 10 by the synchronization data transmitter 25. If the request is sent successfully (OK at step S603), synchronization with the client terminal 10 is performed (S604). If the synchronization server 30 has stopped sending a synchronization signal (YES at step S605), the synchronization signal transmission controller 23 directs the synchronization server 30 to resend the synchronization signal (S606). Then, the process returns to step S600. If the synchronization server 30 has not stopped sending the synchronization signal (NO at step S605), then the process directly returns to S600.

If the transmission of the synchronization request to the client terminal 10 fails at step S603 because the client terminal 10 has moved into a dead space (NG at step S603), the transmitter/receiver 22 immediately disconnect the connection to the network (S607) and the synchronization signal transmission controller 23 directs the synchronization server 30 to stop the synchronization signal transmission (S608). Then, the data server 20 waits (NO at step S609) until an interrogation is sent from the client terminal 10. When it receives the interrogation (YES at step S609), steps S603 through S606 are performed.

Figure 7:
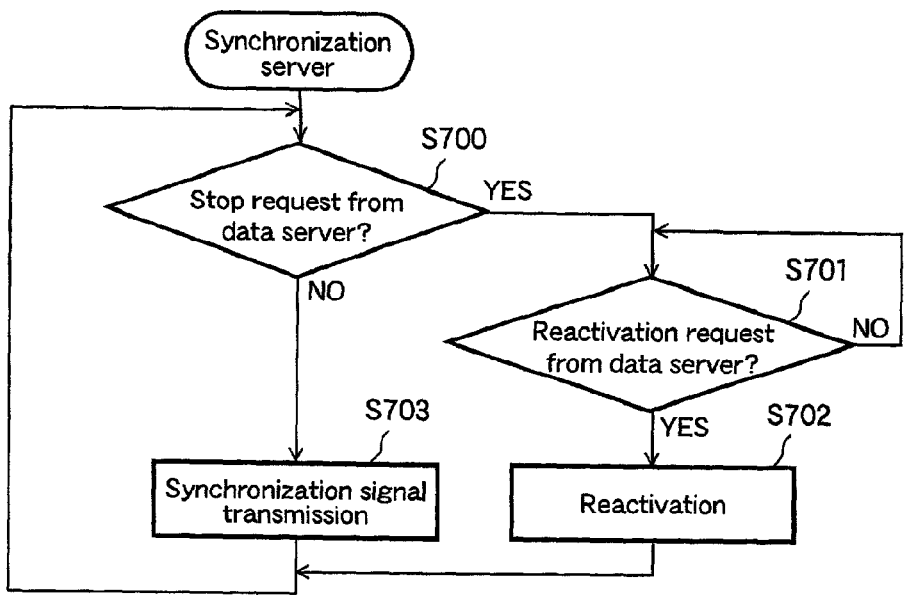
FIG. 7 is a flowchart of an operation flow in a synchronization server.

FIG. 7 shows a flowchart of an operation flow in the synchronization server 30. The synchronization server 30 determines whether a request from the data server 20 for stopping synchronization signal transmission has been received (S700). If the stop request has not been received (NO at step S700), it sends a synchronization signal to the client terminal 10 (S703). If the stop request has been received (YES at step S700), then it determines whether a request for restarting the synchronization signal transmission has been received in the synchronization server 30 (S701). In this embodiment, the synchronization signal transmission restart request is a request from the data server 20 for reactivating the synchronization server 30. The reactivation clears the synchronization signal stop state (S702) and causes the synchronization signal transmission to restart (S700, S702). If the reactivation request has not been received from the data server 20 (NO at step S701), the synchronization signal transmission stop state is maintained.

Figure 8:
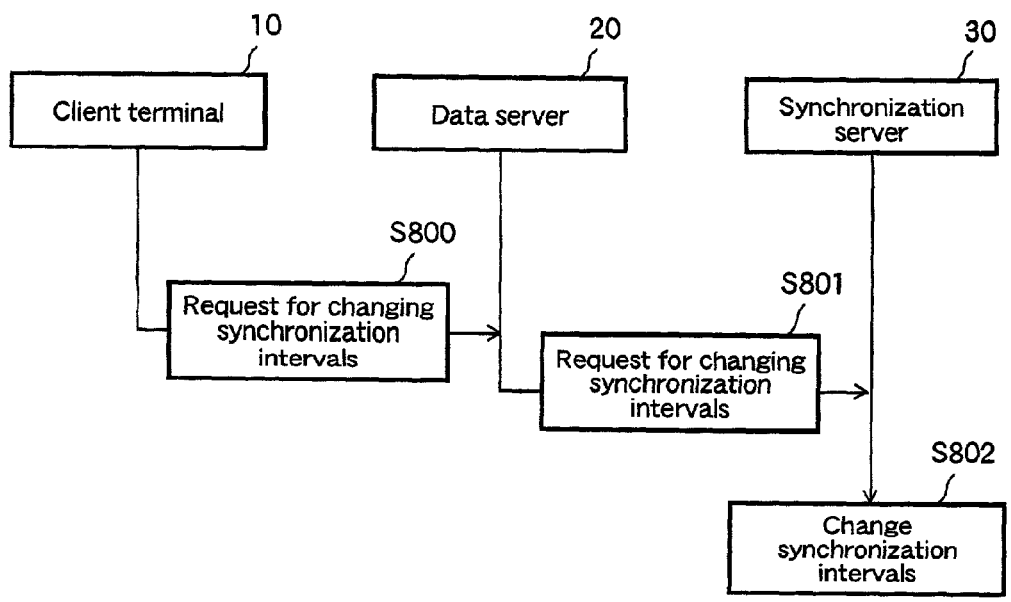
FIG. 8 shows an example of a mechanism for setting transmission timing by a user.

The above-described synchronization signal transmission timing is not limited to a particular date, time, or intervals. The timing of the transmission may be set by a user. FIG. 8 shows an example of a mechanism for setting the timing of the transmission by a user. If the user sets the timing through the client terminal 10, he/she follows instructions on a setting screen (not shown) displayed on the display 142 of the PDA 14 by the timing setting module 149 of the client terminal 10 to input transmission start date and time and interval settings. After the completion of the input, the input setting information is sent to the data server 20 (S800). When the data server 20 receives the setting information, it sends the setting information to the synchronization server 30 (S801). When the synchronization server 30 receives the setting information, the synchronization signal output module 33 changes transmission settings according to the setting information. Then the transmission is started according to the changed settings (S802).

The setting may be performed directly from the data server 20 instead of the client terminal 10. In this case, setting information is input through the timing setting module 24 of the data server 20 and the input setting information is sent to the synchronization server 30 (S801). When the synchronization server 30 receives the setting information, the synchronization signal output module 33, as described above, changes transmission settings according to the setting information, then transmission starts according to the changed settings (S802).

Figure 9:
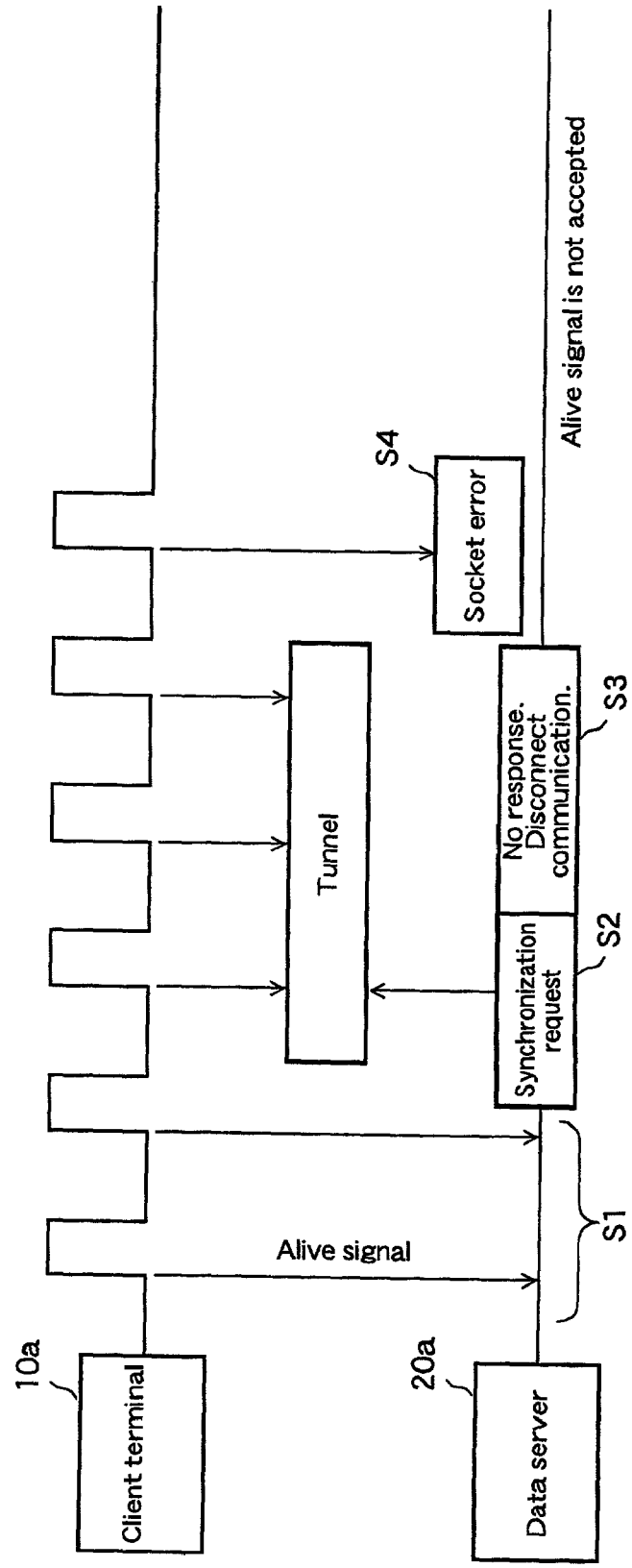
FIG. 9 shows an example of prior-art synchronization methods using an Alive signal in IP solution.

The method in which communication is disconnected and interrogation is conducted by the client terminal 10 based on the result of determination about synchronization status can be used to solve one of the problems with the prior-art method shown in FIG. 9. For example, if a socket error occurs at S4 in FIG. 9, a client terminal 10a can determine that it is out of synchronization and, first disconnect from, then re-connect to a data server 20a to interrogate the data server 20a. After the interrogation, synchronization data is sent from the data server 20a, and then the Alive signal transmission is resumed. Alternatively, the client terminal 10a does not send the interrogation after the reconnection, instead, the data sever 20a may automatically resend a synchronization request at predetermined timing to achieve synchronization.

The embodiment of the present invention has been described. According to the present invention, the server that sends a synchronization signal and the server that sends synchronization data may be implemented as a single server in a system that allows for using different sender telephone numbers depending on data or a signal to be sent. The number of the servers is not restricted. Furthermore, the client terminal may be implemented by any information terminal such as a notebook personal computer and PDA that has a communication function and the present invention can be applied various types of client terminals.

As described in detail above, according to the present invention, in order to achieve synchronization between data in a client terminal and data in a server, the client terminal can determine whether the data held by the client terminal is up-to-date from a synchronization signal sent from the server, and, if the data is not up-to-date, the fact is indicated to the user of the client terminal, thus the user can reliably know the synchronization status of the data and the data can be reliably synchronized with the data in the server. In addition, because the synchronization signal transmission for checking synchronization and the transmission of data to be synchronized are performed separately and the client terminal can distinguish between the synchronization signal and the data to be synchronized on arriving, if a synchronization signal arrives, the client terminal can disconnect communication before incurring a charge and therefore costs for the synchronization can be advantageously reduced.

What is claimed is:

1. A communication system having a client terminal, a server and a communication link, the communication link passing link requests from the server to the client terminal without charging communication costs, the communication link charging communication costs for links which are established between the client terminal and the server, the communication system keeping identicalness between data in the client terminal and data in the server through the communication link, the communication system comprising:

data transmission means for sending data from the server to the client terminal through the communication link, when the client terminal accepts a first link request;

signal transmission means for sending a second link request from the server to the client terminal informing the client terminal of the status of the data in the server at a predetermined timing, the second link request being sent from the server to the client terminal through the communication link;

receipt type determination means for determining whether a link request is transmitted from the data transmission means or the signal transmission means; and connection control means for establishing a link and accepting data sent by the data transmission means in the client terminal, but not establishing a link in response to the second link request sent by the signal transmission means, whereby a status of identicalness between the data in the client terminal and the data in the server is monitored in the client terminal without incurring communication costs.

2. The communication system according to claim 1, wherein said client terminal is a portable information terminal and said communication link is a radio link.

3. The communication system according to claim 1, further comprising a signal transmission control means for controlling said signal transmission means; and wherein said signal transmission control means stops the transmission of the second link request by said signal transmission means if the transmission by said data transmission means results in an error.

4. The communication system according to claim 3, wherein said signal transmission control means causes the transmission of the second link request by said signal transmission means to be resumed after the transmission of the second link request by said signal transmission means is stopped if the data transmission performed by said data transmission means succeeds.

5. The communication system according to claim 1, wherein a sender telephone number of said data transmission means and a sender telephone number of said signal transmission means are different from each other so that, when a link request arrives at said client terminal, client terminal can determine whether the link request is the first link request from said data transmission means or the second link request from said signal transmission means.

6. The communication system according to claim 1, wherein a transmission frequency used by said signal transmission means and a transmission frequency used by said data transmission means are different from each other so that, when a link request arrives at said client terminal, the client terminal can determine whether the link request is the first link request from said data transmission means or the second link request from said signal transmission means.

7. The communication system according to claim 1, wherein the second link request sent by said signal transmission means is sent as a sound wave so that, when a link request arrives at said client terminal, the client terminal can determine whether the link request is the first link request from said data transmission means or the second link request from said signal transmission means.

8. The communication system according to claim 1, wherein the second link request sent by said signal transmission means is sent as infrared so that, when a link request arrives at said client terminal, the client terminal can determine whether the link request is the first link request from said data transmission means or the second link request from said signal transmission means.

9. The communication system according to claim 1, wherein, when the client terminal accepts the first link request, said client terminal sends a send request to said data transmission means, and said data transmission means sends data to said client terminal based on said send request.

10. The communication system according to claim 1, further comprising a timing setting means for setting said predetermined timing.

* * * * *